United States Patent [19]

Newberg et al.

[11] Patent Number: 4,903,029
[45] Date of Patent: Feb. 20, 1990

[54] DELAYED REPLICA RADAR TEST SET TARGET

[75] Inventors: Irwin L. Newberg, Northridge; Adrian E. Popa, Newbury Park, both of Calif.

[73] Assignee: Hughes Aircraft Company, Los Angeles, Calif.

[21] Appl. No.: 169,930

[22] Filed: Mar. 18, 1988

[51] Int. Cl.$^4$ .......................... G01S 7/40; G02F 2/00; G08C 19/36
[52] U.S. Cl. ............................ 342/172; 350/96.13
[58] Field of Search ................ 342/172, 167, 15; 434/2; 350/96.13

[56] References Cited

U.S. PATENT DOCUMENTS

| | | | |
|---|---|---|---|
| 2,421,016 | 5/1947 | Deloraine et al. | 342/172 |
| 3,128,462 | 4/1964 | Woolfson | 342/172 |
| 3,962,657 | 6/1976 | Redman et al. | 342/167 |
| 4,028,702 | 6/1977 | Levine | 342/375 |
| 4,166,212 | 8/1979 | Judeinstein | 350/96.16 X |
| 4,167,328 | 9/1979 | Cross et al. | 350/96.11 |

*Primary Examiner*—Thomas H. Tarcza
*Assistant Examiner*—Gilberto Barron, Jr.
*Attorney, Agent, or Firm*—Leonard A. Alkov; Wanda K. Denson-Low

[57] ABSTRACT

A radar test set target which is co-located with the radar and produces a faithful replica of the radar signal substantially delayed in time. The radar signal modulates a laser light which is controllable delayed in time by transmitting the modulated laser light through a fiber optic delay line. The output of the delay line is demodulated and the extracted and delayed radar signal is returned to the radar as a test signal.

37 Claims, 3 Drawing Sheets

DELAYED REPLICA RADAR TEST SET TARGET

BACKGROUND OF THE INVENTION

1. Field of the Invention

This invention relates to radar test devices and, more particularly, to radar test sets which are generally co-located with the radar and produce a substantially delayed replica of the transmitted radar signal to simulate reflection of the radar signal off of a distance target.

2. Description of Related Art

Overall (end-to-end) radar system performance can be evaluated by reflecting the radar signal off of a target located a great distance from the radar. This great distance, unfortunately, creates several problems.

One problem is that it is often difficult to accurately point the radar at the test target. Another problem is that the radar signal often is reflected off of other objects, in addition to the test target, creating undesirable "clutter".

A still further problem is that such tests often need to be performed with signals having relatively high power in order to obtain a return signal of adequate strength. And a still further problem is that it is often difficult to coordinate efforts when part of the test system is located a great distance from the other part.

In order to avoid these problem, numerous efforts have been made to design radar test targets which, although co-located with the radar, contain a device which will nevertheless produce a delayed replica of the radar signal.

One such effort uses a co-located wave guide. Unfortunately, the only practical use for such a device is to create short delays. A long delay would require a long waveguide which would be bulky, inflexible and would generate large losses.

Another effort has been to use long coaxial cables to create the delay. Unfortunately, this technique causes very high and undesirable losses when a long delay is produced. The coaxial cable is also very bulky, making it difficult to easily switch in a cable having a different length when a different delay is desired.

A still further technique is to mix the radar signal with a much lower frequency carrier, transmit that mixed carrier through a digital, quartz, or surface acoustic wave (SAW) delay line, and to then re-mix the delayed signal back to radar frequency.

Such mixing efforts, however, have been far from ideal. The mixing is usually inefficient, adding noise and other types of errors. Further, such techniques generally result in high losses. They also usually require reference and timing signals, making the test target a fairly complex, cumbersome, and expensive system.

In short, there has been a continuing need for a radar test target which can be co-located with the radar and which will produce a faithful replica of the radar signal, substantially delayed in time.

SUMMARY OF THE INVENTION

One object to the present invention is to eliminate these and other problems in the prior art.

Another object of the present invention is to provide a radar test target which can be co-located with the radar and which will produce a faithful replica of the radar signal, substantially delayed in time.

A still further object of the present invention is to provide a radar test target operating at the radar frequency (wide bandwidth) which produces very low losses in the delay medium, requires no reference or timing signals, can be effectively used with very low level radar signals, operates completely independent of the radar, requires no pointing, is relatively immune to "clutter", and has a simple and uncomplicated design.

These and other objects of the present invention are achieved by modulating laser light with the radar signal, by propagating the modulated laser light through a fiber optic delay line, and by thereafter demodulating the delayed and modulated laser light, thereby extracting the delayed radar signal.

Both direct and indirect modulation techniques are disclosed. A switch and attenuator can also advantageously be added in association with control electronics to alter the phase and/or amplitude of the delayed replica signal, thereby enhancing the flexibility of target simulation.

The invention can also be used with or without actual radiation of the radar signal.

These as well as other objects, features, and advantages of the present invention will become apparent from consideration of the following detailed description and accompanying drawings.

DESCRIPTION OF THE PREFERRED EMBODIMENTS

Figure 1:
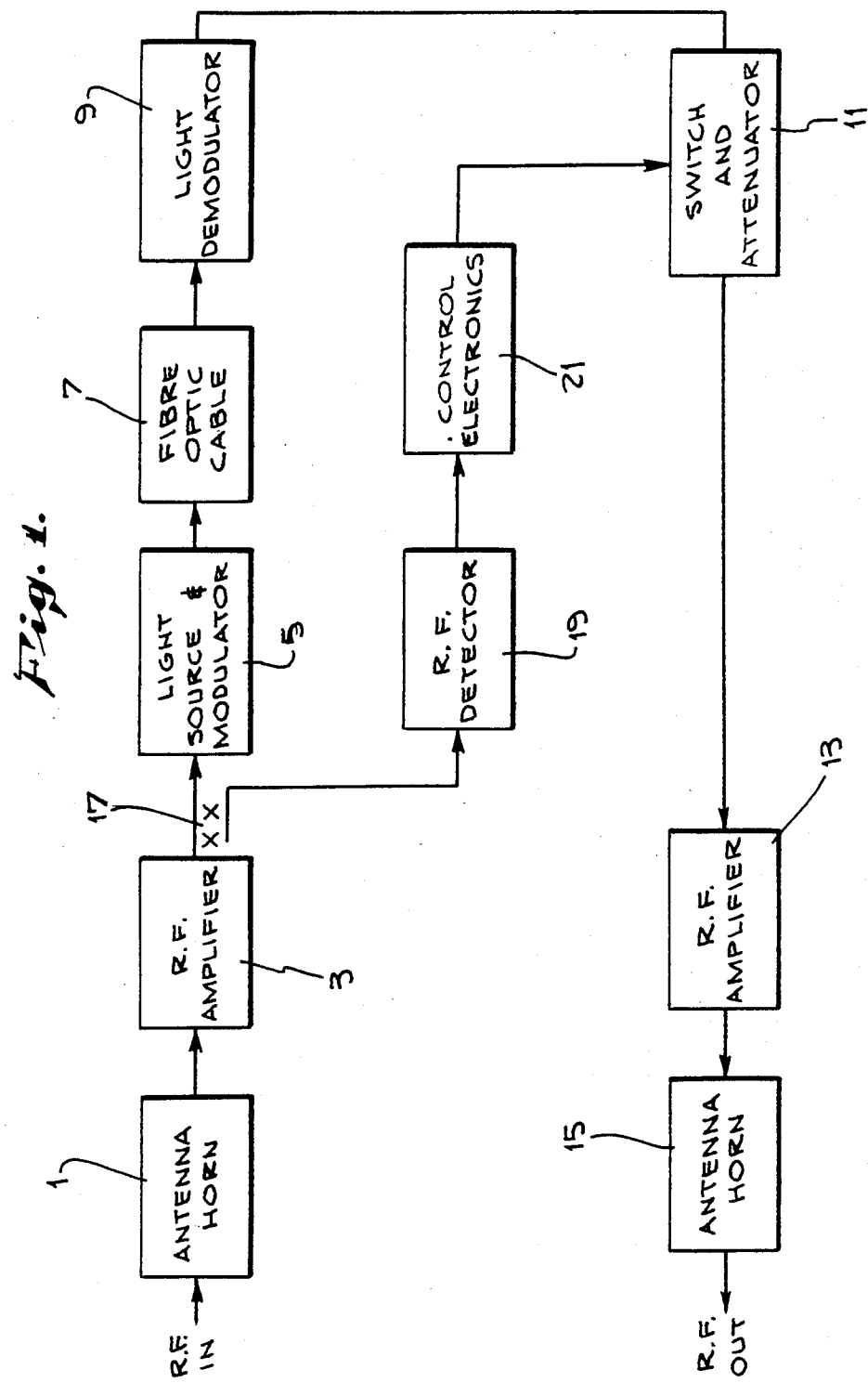
FIG. 1 is a block diagram of the preferred embodiment of the present invention.

FIG. 1 is a block diagram of the preferred embodiment of the present invention.

As shown in FIG. 1, R.F. from the radar transmitter is received by an antenna horn 1 and amplified by an R.F. amplifier 3.

The output of the R.F. amplifier 3 is delivered to a light source and modulator 5 which produces a light having an intensity which is proportional to the R.F. signal generated by the radar transmitter.

The modulated light, in turn, is connected to one end of a fiber optic cable 7. The other end of the fiber optic cable 7 is fed to a light demodulator 9 which demodulates the delayed R.F. signal from the light by producing a signal which is proportional to the intensity of the light.

This demodulated signal is then passed through a switch and attenuator 11 and back into an R.F. amplifier 13. The amplified and delayed R.F. is then radiated by antenna horn 15. The antenna horn 15 radiates the delayed radar signal and is received by the radar signal receiver (not shown).

When located close to the radar receiver, neither the antenna horn 15 nor the horn on the radar receiver need be pointed at one another. If desired, however, the horn 15 can be located a short distance away from the horn on the radar receiver, thereby requiring pointing and thus facilitating pointing and tracking testing.

A coupler 17 may be used to obtain a sample of the amplified R.F. signal coming from the R.F. amplifier 3. This signal is delivered to an R.F. detector 19 and, in turn, to control electronics 21, which is also connected to the switch and attenuator 11.

As is well known in the art, the R.F. detector 19, which typically might be a pin diode, and control electronics 21 operate in conjunction with the switch and attenuator 11 to effectuate controlled phase and/or amplitude changes in the delayed radar signal. This allows the radar test target to simulate a broad variety of real targets under varied conditions, as is also well known in the art.

For example, the control electronics 21 may be set to cause the switch and attenuator 11 to attenuate the amplitude of the signal received from the light demodulator 9. This might be done to test the sensitivity of the radar receiver.

Another possibility is for the control electronics 19 to be set to imitate a doppler shift in the delayed radar signal. This could be done, for example, by having the control electronics 21 signal the switch and attenuator 11 not to pass every other delayed radar pulse, thereby giving the return signal the appearance of having a doppler modulation frequency of one-half the radar pulse repetition frequency. In this mode, the detected signal supplied by the R.F. detector 19 would be used by the control electronics 21 to synchronize the control signals which it delivers to the switch and attenuator 11 with the radar pulse train (PRF). Other doppler-shift techniques known in the art could also advantageously be implemented.

As should be apparent to those skilled in the art, the radar test target illustrated in FIG. 1 can also advantageously function without the coupler 17, the R.F. detector 19, the control electronics 21, and the switch and attenuator 11. In this instance, the output from the R.F. amplifier 3 would be connected directly to the light modulator 5 and the output from the light demodulator 9 would be fed directly to the R.F. amplifier 13.

The radar test set shown in FIG. 1 can also operate without the antenna horns and/or 15 and the R.F. amplifiers 3 and/or 13. More specifically, the radar signal from the radar transmitter could be directly connected to the light modulator 5. Similarly, the delayed radar signal emanating from the light demodulator 9 could be directly connected to the radar receiver. Such a simplified system is useful in those situations when actual radiation of the transmitted and/or "reflected" radar signal is not desired. Conversely, if reception and retransmission did not have to occur simultaneously, a single antenna horn could function as both antenna horn 1 and 15 and a single R.F. amplifier could function as R.F. amplifier 3 and 13. Of course, appropriate switching circuitry would have to be added.

If used, the antenna horns 1 and 15, R.F. amplifiers 3 and 13, coupler 17, switch and attenuator 11, R.F. detector 19, and control electronics 21 are all constructed in accordance with techniques and circuitry well known in the art. Of course, each of these subsystems should operate linearly within the contemplated frequency range of the radar signals to be tested and with the desired sensitivity and noise levels.

Although any type of light could be produced and modulated by the light source and modulator 5, it has been found that laser light works best. For this reason, laser light is used in the preferred embodiment.

Figure 2:
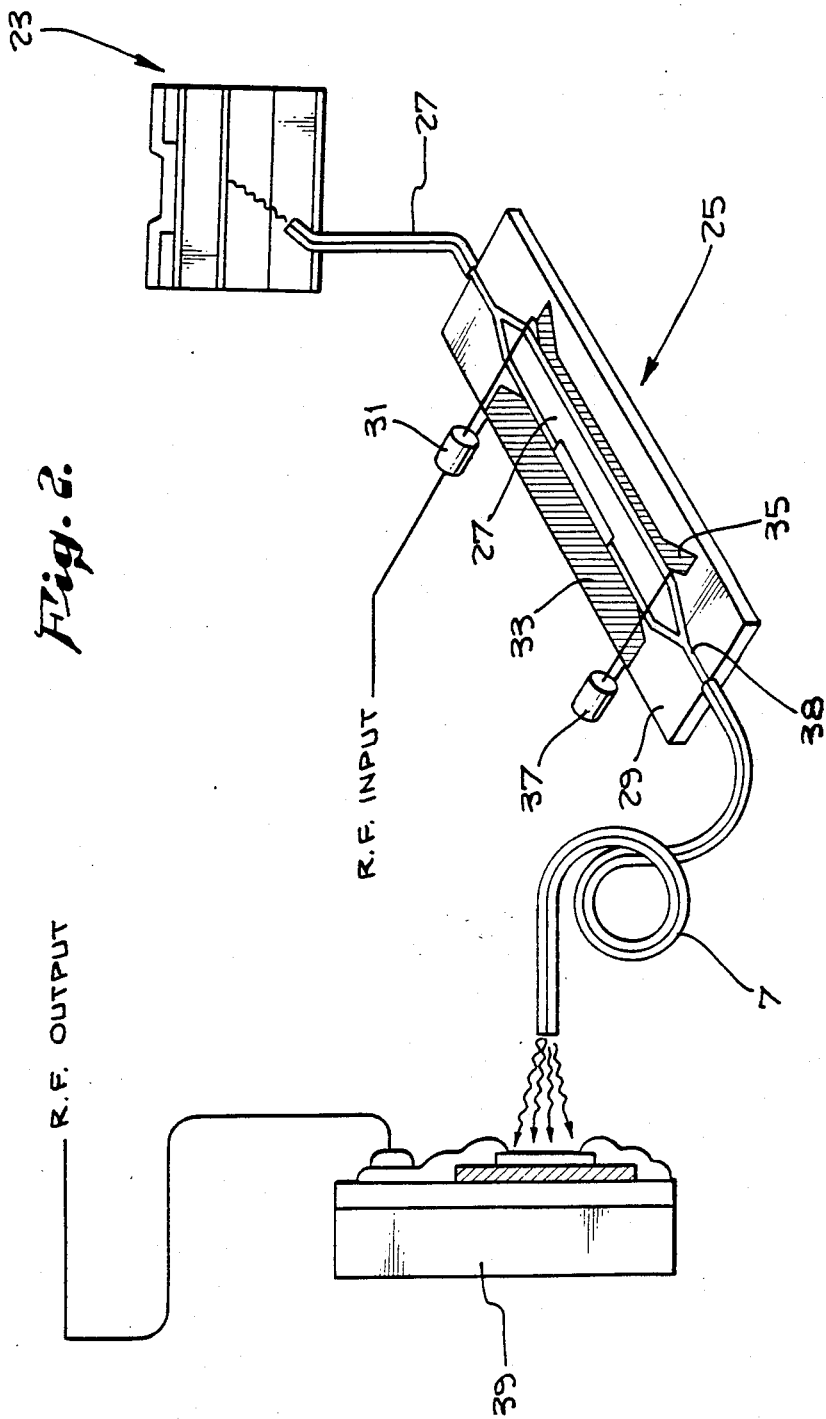
FIG. 2 is a pictorial diagram showing certain components of the system shown in FIG. 1 selected to operate with laser light.

FIG. 2 is a pictorial diagram showing certain components of the system shown in FIG. 1 selected to operate with laser light.

More specifically, the light source and modulator 5 shown in FIG. 1 includes a laser diode 23 which, as is well known in the art, is a semiconductor device which emits a laser light when current is passed through it. (Other types of lasers could also be used, including gas lasers.) In order to insure that the emitted laser light is of constant amplitude, the current passed through the laser diode 23 should also be constant.

The laser light emitted by the laser diode 23 is then coupled to a light modulator 25 through a short length of a fiber optical cable 27. The light modulator 25 performs the modulation function of the light source and modulator 5 shown in FIG. 1.

It is important that the coupling from the laser diode 23 to the fiber optic cable 27 be highly efficient, so as to minimize signal losses at the coupling junction. It is also important that reflection of this coupling be kept to a minimum, so as to minimize nonlinearities in the system.

Techniques for minimizing losses and reflection at the coupling junction are well known in the art and should be followed. Alternately, the laser diode 23 can be purchased having already affixed thereto a "pigtail", i.e., a short length of fiber optic material coupled to the laser diode by the manufacturer in a fashion which minimizes loss and reflection.

Although other types could be used within the scope of the present invention, the light modulator 25 in the preferred embodiment is the Mach-Zehnder interferometric modulator described by Gee et al. in their article 17-*GHz band Electro-Optic Modulator*, published December 1, 1983 in Applied Physic Letters, Vol 43, pp. 998–1000.

Essentially, the light modulator 25 is a device which directs the light through a titanium wave guide 27 which is embedded into a lithium niobate electro-optic crystal 29. The R.F. input which modulates the light is delivered through a transmission line 31 which, in turn, is connected to one end of a pair of conducting coplanar strip lines 33 and 35. The other end of the coplanar strip lines 33 and 35 are terminated by a matching resistance 37.

In operation, the imposition of the R.F. input across the coplanar strip lines 33 and 35 creates an electric field which modulates the intensity of the intervening light in accordance with the intensity of the electric field. For more information concerning the structure and operation of the light modulator 25, the referenced article by Gee et al. should be reviewed.

The light output 38 of the light modulator 25 is then coupled to one end of the fiber optic cable 7. The other end of the fiber optic cable 7 is coupled to an optical detector (photo detector) 39 which, as is well known in the art, is a semiconductor device which produces a current which is directly proportional to the intensity of the light, thereby performing the demodulation function of the light demodulator 9 shown in FIG. 1. Other demodulation techniques could also be used within the scope of the present invention.

As with the laser diode 23, it is also important to efficiently couple the output of the fiber optic cable 7 to the optical detector 39 so as to minimize losses and reflection, all in accordance with techniques well known in the art. Optical detectors can also be purchased with a pigtail of fiber optic material already attached to the optical detector in a fashion which is efficient and results in minimum reflection. If an optical detector is selected which already has a pigtail attached by the manufacturer, this can be conveniently connected to the fiber optic cable 7 by a fiber optic connector or any of the other well known techniques for efficiently joining separate fiber optic cables.

The modulation technique pictorially illustrated in FIG. 2 is known as indirect (or external) modulation because the light intensity is not modulated until after it is created.

Figure 3:
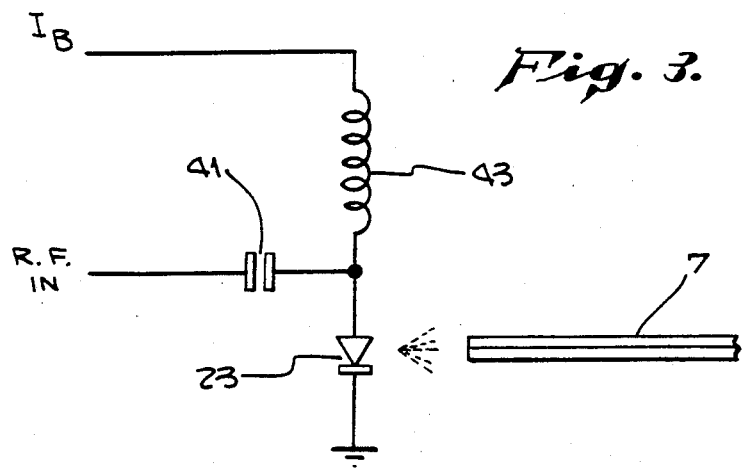
FIG. 3 is a schematic diagram of an alternate embodiment of the light source and modulator shown in FIG. 1.

FIG. 3 is a schematic diagram of an alternate embodiment of the light source and modulator 5 shown in FIG. 1. This embodiment uses a direct modulation technique. The light intensity is modulated at the very moment of its creation.

FIG. 3 consists of the laser diode 23 having one end connected to ground and the other connected to a capacitor 41 and an inductor 43. The other end of the capacitor 41 is connected to the input R.F. signal, and the other end of the inductor 43 is connected to a constant source of D.C. current $I_B$.

This configuration is known as a bias-tee network.

The purpose of the constant D.C. current $I_B$ is to bias the laser diode 23 such that it always operates in its linear region during modulation. Although the exact amount of this current will vary depending upon the specific choice for the laser diode 23, typical bias currents will be in the order of 70 to 100 milliamps.

The purpose of the capacitor 41 is to allow passage of the R.F. signal into the laser diode 23 and at the same time to prevent the R.F. source from affecting the D.C. bias current. Although the exact value of this capacitance will vary depending upon the relative magnitude and frequency of the signals involved, capacitances in the order of 100 picofarads would be typical.

The inductor 43 performs a function basically opposite of the function performed by the capacitor 41. More specifically, the inductor 43 allows passage of the bias current into the laser diode 23, while at the same time prevents the current source from draining the R.F. coming from the capacitor 41. Although the value of the inductor 43 will similarly vary depending upon the relative magnitude and frequency of the signals involved, its value will typically be around one microhenry.

The light output of the laser diode 2 is then coupled to the fiber optic cable 7, using the same techniques and with the same considerations as was discussed above with respect to FIG. 2.

The amount of delay, of course, will be directly proportional to the length of the fiber optic cable 7. And in practice, different lengths can easily be switched in and out as needed.

When long delays are desired, as is often the case, the length of the fiber optic cable 7 will be such that it may be wound in a coil in order to cause the radar test target device to be small in size. Although almost any type of coiling is acceptable, in the preferred embodiment applicant chooses to keep the radius of all windings at no less than one inch. Otherwise, the level of undesirable loss may increase substantially.

The material of fiber optic cable 7 should be selected so as to minimize loss, distortion and dispersion. Generally, this will mean that the diameter of the cable should match the wavelength of the laser light and that "single mode" fiber optic material should be used.

It is also preferred that the laser light emitted by the laser diode 23 be very short in length, typical around 1.3 or 1.5 micrometers. Although longer or shorter wave lengths can be used, these other wave lengths contribute to losses in the fiber optic material and increases in undesirable dispersion.

Figure 4:
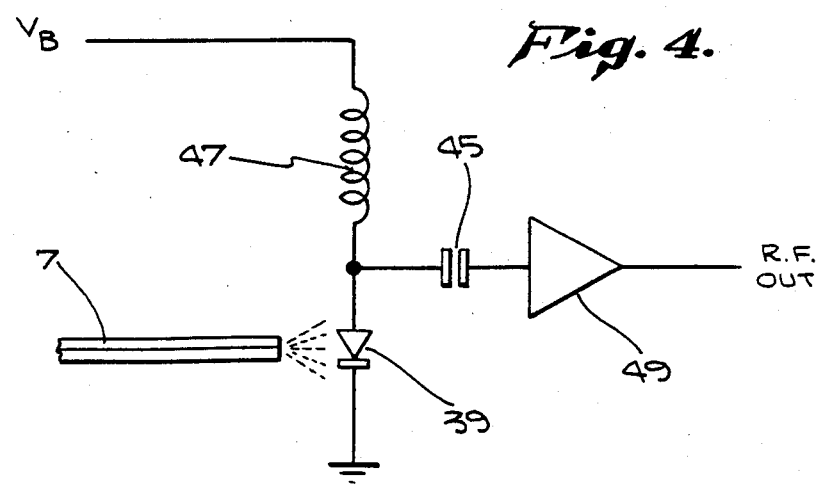
FIG. 4 is a schematic diagram of a preferred embodiment of the circuitry used to operate the optical detector shown in FIG. 2.

FIG. 4 is a schematic diagram of a preferred embodiment of the circuitry used to operate the optical detector 39 shown in FIG. 2. As shown in FIG. 4, the other end of the fiber optic cable 7 is coupled to the optical detector 39, one end of which is grounded. The other end of the optical detector 39 is connected to a capacitor 45 and an inductor 47. The other end of the capacitor 45 is connected to an R.F. pre-amplifier 49, and the other end of the inductor 47 is connected to a constant negative D.C. voltage $V_B$.

Just as with the laser diode 23, it is also necessary to bias the optical detector 39. However, unlike the laser diode 23, the purpose of the bias is to reduce junction capacitance which might otherwise deteriorate its high frequency performance. This is done by delivering a constant negative voltage, $-V_B$, into the optical detector 39 through the aforementioned circuitry, which is also known as a bias-tee network. Although the exact amount of the negative voltage will depend upon the particular optical detector which is chosen and the relative magnitude and frequency of the signals involved, typically it will be around minus 10–20 volts.

The inductor 47 and the capacitor 45 perform a function similar to the inductor 43 and the capacitor 41 shown in FIG. 3. More specifically, the inductor 47 allows passage of the reverse biasing voltage into the optical detector 39 without allowing the R.F. component of the demodulated laser light to be loaded by the voltage source. Similarly, the capacitor 45 allows passage of the demodulated R.F. into the pre-amplifier 45 without allowing the pre-amplifier 45 to affect the reverse bias voltage. Although the exact values of the inductor 47 and the capacitor 45 will, again, depend upon the precise frequency and magnitude of the signal involved, they will typically be around one microhenry and 100 picofarads, respectfully.

Although the system disclosed in FIG. 1 uses a non-coherent optical fiber transmission technique, a coherent optical fiber transmission technique could alternatively be employed within the scope of the present invention, such as the coherent technique discussed by Basch and Brown in *Introduction to Coherent Optical Fiber Transmission*, published in May of 1985 in *IEEE Communications Magazine*, Vol. 23, No. 5. In this instance, a second laser could be used as a local oscillator and heterodyned with the output of the fiber optic cable 7 at the output of the light demodulator 9, using the techniques discussed in the article.

Although only certain embodiments of the present invention have been described, it is to be understood that the present invention is applicable to a broad variety of other embodiments, processes and parameters and that the present invention is defined and limited solely by the following claims.

What is claimed is:

1. A radar test set for producing a delayed replica of an R. F. radar signal comprising:
   a. light means for generating a light;
   b. modulation means connected to the radar signal and to said light means for modulating the light generated by said light means in accordance with the radar signal;
   c. delay means connected to said modulation means for delaying the modulated light, said delay means including a fiber optic cable have two ends, one end of which is connected to the modulated light; and d. demodulator means connected to the other end of said fiber optic cable for extracting from the modulated light the delayed radar signal.

2. The radar test set of claim 1 wherein said light means emits laser light.

3. The radar test set of claim 2 wherein said light means further includes a laser diode and wherein said modulation means includes a bias-tee network connected to said diode.

4. The radar test set of claim 3 wherein said bias-tee network includes a capacitor and an inductor connected together at one end to said diode, the other end at said capacitor being connected to the radar signal, and the other end of said inductor being connected to a source of constant D.C. current.

5. The radar test set of claim 2 wherein said fiber optic cable has a diameter which is matched to the frequency of the laser light.

6. The radar test set of claim 1 wherein said modulation means modulates the intensity of the light at the moment it is generated.

7. The radar test set of claim 1 wherein said demodulator means includes an optical detector.

8. The radar test set of claim 7 wherein said demodulator means further includes a bias-tee network connected to said optical detector.

9. The radar test set of claim 8 wherein said bias-tee network includes a capacitor and an inductor, each connected at one end to said optical detector, the other end of said capacitor being connected to deliver the demodulated R.F. output, and the other end of said inductor being connected to a source of constant D.C. voltage.

10. The radar test set of claim 1 wherein said light means generates a light of substantially constant intensity and wherein said modulator means modulates the light after the light is produced.

11. The radar test set of claim 10 wherein said modulator means includes a device which modulates the laser light using a pair of electrodes and wherein a potential is applied to said electrodes having a magnitude substantially proportional to the radar signal.

12. The radar test set of claim 11 wherein said modulator means includes an interferometric modulator.

13. The radar test set of claim 12 wherein said interferometric modulator includes a wave guide embedded in an optical crystal.

14. The radar test set of claim 13 wherein said wave guide is made of titanium and wherein said optical crystal is made of lithium niobate.

15. The radar test set of claim 1 wherein said fiber optic cable is coiled and wherein no portion of said coil makes an arc having a radius less than one inch.

16. The radar test set of claim 1 wherein said fiber optic cable is a single mode type.

17. The radar test set of claim 1 wherein the radar signal is radiated and wherein said radar test set further includes:

a. receiving means for receiving the radiated radar signal; and b. first amplifier means connected to said receiving means and to said modulation means for amplifying the radar signal which is received by said receiving means.

18. The radar test set of claim 17 wherein said receiving means includes an antenna horn.

19. The radar test set of claim 17 further including:

a. second amplifier means connected to said demodulator means for amplifying the delayed radar signal; and b. transmitting means connected to said second amplification means for radiating the delayed radar signal.

20. The radar test set of claim 19 wherein said transmitting means includes an antenna horn.

21. The radar test set of claim 1 further including attenuator means connected to said demodulator means for altering the amplitude of the delayed radar 22. The radar test set of claim 21 further including control electronics connected to said attenuator means for controlling the amount of said amplitude alteration.

23. The radar test set of claim 1 further including:

a. switch means connected to said demodulator means for blocking the passage of a portion of the signal coming from said demodulator means;

b. control electronics connected to said switch means for controlling which of said portion is blocked; and c. second detector means connected to said control electronics and to the radar signal for providing said control electronics with a synchronizing signal.

24. The radar test set of claim 23 further including a coupler to connected said second detector means to the radar signal.

25. A radar test set for producing a delayed replica of an R.F. radar signal comprising:

a. a laser diode for emitting laser light:

b. modulation means connected to the radar signal for modulating the intensity of the laser light produced by said laser diode in accordance with the radar signal;

c. a fiber optic cable having two ends, one end of which is coupled to the modulated laser light; and d. an optical detector connected to the other end of said fiber optic cable for extracting from the modulated laser light the delayed radar signal.

26. A radar test set for producing a delayed replica of an R.F. radar signal comprising:

a. light means for generating a laser light;

b. modulation means connected to the radar signal and to said light means for modulating the laser light generated by said light means in accordance with the radar signal;

c. a fiber optic cable having two ends, one end of which is connected to the modulated laser light, said fiber optic cable having a diameter which is matched to the frequency of the laser light, being of a single mode type, and being coiled with no portion of said coil making an arc having a radius less than one inch; and d. demodulator means connected to the other end of said fiber optic cable for extracting from the modulated laser light the delayed radar signal.

27. A radar test set for producing a delayed replica of a radar signal comprising:

a. light means for generating a light wherein said light means emits laser light and wherein said light means further includes a laser diode;

b. modulation means connected to the radar signal and to said light means for modulating the light generated by said light means in accordance with the radar signal, wherein said modulation means includes a bias-tee network connected to said diode;

c. delay means connected to said modulation means for delaying the modulated light, said delay means including a fiber optic cable have two ends, one end of which is connected to the modulated light; and d. demodulator means connected to the other end of said fiber optic cable for extraction from the modulated light the delayed radar signal.

28. The radar test set of claim 27 wherein said bias-tee network includes a capacitor and an inductor connected together at one end to said diode, the other end of said capacitor being connected to the radar signal, and the other end of said inductor being connected to a source of constant D.C. current.

29. A radar test set for producing a delayed replica of a radar signal comprising:

a. light means for generating light;

b. modulation means connected to the radar signal and to said light means for modulating the light generated by said light means in accordance with the radar signal;

c. delay means connected to said modulation means for delaying the modulated light, said delay means including a fiber optic cable have two ends, one end of which is connected to the modulated light; and d. demodulator means connected to the other end of said fiber optic cable for extracting from the modulated light the delayed radar signal wherein said demodulator means includes an optical detector, and wherein said demodulator means further includes a bias-tee network connected to said optical detector.

30. The radar test set of claim 29 wherein said bias-tee network includes a capacitor and an inductor, each connected at one end to said optical detector, the other end of said capacitor being connected to deliver the demodulated R.F. output, and the other end of said inductor being connected to a source of constant D.C. voltage.

31. A radar test set for producing a delayed replica of a radar signal comprising:

a. light means for generating a light, wherein said light means generates a light of substantially constant intensity;

b. modulation means connected to the radar signal and to said light means for modulating the light generated by said light means in accordance with the radar signal, wherein said modulation means includes a device which modulates the laser light using a pair of electrodes and wherein a potential is applied to said electrodes having a magnitude substantially proportional to the radar signal;

c. delay means connected to said modulation means for delaying the modulated light, said delay means including a fiber optic cable have two ends, one end of which is connected to the modulated light; and d. demodulator means connected to the other end of said fiber optic cable for extracting from the modulated light the delayed radar signal.

32. The radar test set of claim 31 wherein said modulation means includes an interferometric modulator.

33. The radar test set of claim 32 wherein said interferometric modulator includes a wave guide embedded in an optical crystal.

34. The radar test set of claim 33 wherein said wave guide is made of titanium and wherein said optical crystal is made of lithium niobate.

35. A radar test set for producing a delayed replica of a radar signal comprising:

a. light means for generating a light; modulation means connected to the radar signal and to said light means for modulating the light generated by said light means in accordance with the radar signal;

c. delay means connected to said modulation means for delaying the modulated light, said delay means including a fiber optic cable have two ends, one end of which is connected to the modulated light;

d. demodulator means connected to the other end of said fiber optic cable for extracting from t he modulated light the delayed radar signal;

e. attenuator means connected to said demodulator means for altering the amplitude of the delayed radar signal; and f. control electronics connected to said attenuator means for controlling the amount of said amplitude alteration.

36. A radar test set for producing a delayed replica of a radar signal comprising:

a. light means for generating a light;

b. modulation means connected to the radar signal and to said light means for modulating the light generated by said light means in accordance with the radar signal;

c. delay means connected to said modulation means for delaying the modulated light, said delay means including a fiber optic cable have two ends, one end of which is connected to the modulated light;

d. demodulator means connected to the other end of said fiber optic cable for extracting from the modulated light the delayed radar signal;

e. switch means connected to said demodulator means for blocking the passage of a portion of the signal coming from said demodulator means;

f. control electronics connected to said switch means for controlling which of said portion is blocked; and g. second detector means connected to said control electronics and to the radar signal for providing said control electronics with a synchronizing signal.

37. The radar test set of claim 36 further including coupler to connect said second detector means to the radar signal.

* * * * *